(12) United States Patent
Rowe

(10) Patent No.: US 11,147,288 B2
(45) Date of Patent: Oct. 19, 2021

(54) CHEWABLE PRODUCT AND PROCESS FOR MAKING SAME

(71) Applicant: IAF Science Holdings Limited, Hamilton (BM)

(72) Inventor: John Lawrence Rowe, Charlottetown, CA (US)

(73) Assignee: IAF SCIENCE HOLDINGS LTD., Hamilton (BM)

( * ) Notice: Subject to any disclaimer, the term of this patent is extended or adjusted under 35 U.S.C. 154(b) by 0 days.

(21) Appl. No.: 15/026,213

(22) PCT Filed: Sep. 30, 2014

(86) PCT No.: PCT/CA2014/050936
§ 371 (c)(1),
(2) Date: Mar. 30, 2016

(87) PCT Pub. No.: WO2015/042723
PCT Pub. Date: Apr. 2, 2015

(65) Prior Publication Data
US 2016/0219901 A1    Aug. 4, 2016

Related U.S. Application Data

(60) Provisional application No. 61/884,276, filed on Sep. 30, 2013.

(51) Int. Cl.
*A23G 3/42* (2006.01)
*A23G 3/34* (2006.01)
(Continued)

(52) U.S. Cl.
CPC ............. *A23G 3/42* (2013.01); *A23G 3/0044* (2013.01); *A23L 21/25* (2016.08); *A23L 29/231* (2016.08);
(Continued)

(58) Field of Classification Search
None
See application file for complete search history.

(56) References Cited

U.S. PATENT DOCUMENTS

| 2,295,274 A | 9/1942 | Walker |
| 5,750,175 A | 5/1998 | Hubbell |

(Continued)

FOREIGN PATENT DOCUMENTS

| CN | 1089096 | 7/1994 |
| CN | 1234230 | 11/1999 |

(Continued)

OTHER PUBLICATIONS

Durand: Recipe: D.I.Y. Fruity Gumdrops; published Dec. 18, 2006 at: https://www.thekitchn.com/recipe-diy-frui-15941 (Year: 2006).*
(Continued)

*Primary Examiner* — Patricia A George
(74) *Attorney, Agent, or Firm* — Norton Rose Fulbright US LLP

(57) ABSTRACT

The present disclosure concerns process for making chewable product using, as the main ingredient, a substantially dehydrated and/or a supplemented complex carbohydrate. The present disclosure provides the chewable products obtained as well as their use in confectionary or as delivery system for active ingredients.

17 Claims, 5 Drawing Sheets

(51) Int. Cl.
*A23L 29/231* (2016.01)
*A23L 29/281* (2016.01)
*A23L 21/25* (2016.01)
*A23L 33/10* (2016.01)

(52) U.S. Cl.
CPC ............ *A23L 29/284* (2016.08); *A23L 33/10* (2016.08); *A23V 2002/00* (2013.01)

(56) References Cited

U.S. PATENT DOCUMENTS

| | | | |
|---|---|---|---|
| 2002/0197356 A1 | 12/2002 | Katz | |
| 2007/0269577 A1 | 11/2007 | Pershad et al. | 426/607 |
| 2009/0123597 A1 | 5/2009 | Williams et al. | 426/3 |
| 2011/0008487 A1 | 1/2011 | Bousquet et al. | 426/2 |
| 2011/0206811 A1* | 8/2011 | Sarig | A23L 29/10 426/87 |
| 2013/0071548 A1 | 3/2013 | Williams et al. | 426/648 |

FOREIGN PATENT DOCUMENTS

| | | |
|---|---|---|
| CN | 1364058 | 8/2002 |
| CN | 1394517 | 2/2003 |
| CN | 1662147 | 8/2005 |
| CN | 101179944 | 5/2008 |
| CN | 101242807 | 8/2008 |
| CN | 101731419 | 6/2010 |
| CN | 102058007 | 5/2011 |
| CN | 103052326 | 4/2013 |
| JP | 6196963 | 5/1986 |
| WO | WO 9940901 | 8/1999 |
| WO | WO 2009/090668 | 7/2009 |
| WO | WO 2010/052703 | 5/2010 |
| WO | WO 2010081232 | 7/2010 |
| WO | WO 2010120884 | 10/2010 |
| WO | WO 2010151275 | 12/2010 |
| WO | WO 2011160003 | 12/2011 |
| WO | WO 2012173587 | 12/2012 |
| WO | WO 2012175036 | 12/2012 |

OTHER PUBLICATIONS

H&F: Herbstreith & Fox: Confectionary Gum and Jelly Products; revised Jul. 2004. (Year: 2004).*
Hebbar: Properties of Dried and Intermediate Moisture Honey Products: A Review, International Journal of Food Properties, 11: 804-819, 2008. (Year: 2008).*
Davis: WO2012173587A1; published Dec. 20, 2012. (Year: 2012).*
DeWan: The magic of caramel; Chicago Tribune; Jul. 29, 2009. (Year: 2009).*
Lancaster: How to Calculate the Final Temperature of a Mixture; published online at least by May 1, 2017 at: https://web.archive.org/web/20170501075920/https://sciencing.com/calculate-final-temperature-mixture-8306178.html (Year: 2017).*
Office Action issued in Australian Application No. 2014328405, dated Jul. 5, 2017.
Search Opinion issued in European Application No. 14846830.9, dated Nov. 28, 2017.
Souci, "Honey" Wissenschaftliche Verlagsgesellschaft mbH, pp. 1241-1241, (2008).
Supplementary European Search Report issued in European Application No. 14846830.9, dated Nov. 28, 2017.
Timothy Ferriss, The 4-Hour Chef: The Simple Path to Cooking Like a Pro, Learning Anything, and Living the Good Life, p. 396, The Science of Gels. Olive Oil Gummy Bears, 2012.
Gummy Candy with Pectin, Cookpad, [online], Feb. 11, 2014, URL < https://cookpad.com/recipe/2492631 > (Machine Translation).
Office Action issued in Japanese Patent Application No. 2016-518742, dated Aug. 28, 2018. (English Translation).
Extended European Search Report Issued in Corresponding European Application No. 19170216.6, dated May 15, 2019.
Office Action issued in Corresponding Korean Application No. 10-2016-7011564, dated May 31, 2021 (English Translation).
Office Action issued in corresponding Chinese application No. 2014800654460, dated Nov. 25, 2019.

* cited by examiner

CHEWABLE PRODUCT AND PROCESS FOR MAKING SAME

CROSS-REFERENCE TO RELATED APPLICATIONS

This application is a national phase application under 35 U.S.C. § 371 of International Application No. PCT/CA2014/050936 filed Sep. 30, 2014, which claims priority from U.S. Provisional Patent Application 61/884,276 filed on Sep. 30, 2013. The entire contents of each of the above-referenced disclosures is specifically incorporated herein by reference without disclaimer.

TECHNOLOGICAL FIELD

The present disclosure relates to processes for manufacturing a chewable product using a complex natural carbohydrate as well as to the chewable product obtained from this process.

BACKGROUND

Chewable compositions (such as gummy compositions) are conventionally made by boiling a carbohydrate solution twice, i.e., before and after the addition of a gelling solution. The requirement of boiling twice the carbohydrate solution during the process for making the chewable compositions limits the type of additives which can be included in the composition (especially if they are temperature-sensitive) as well as the timing for introducing such additives during the process.

Further, it is often required to adjust the pH (usually by adding an acidifying agent) of the carbohydrate solution prior to the addition of the gelling solution in order to allow the formation of a gel in the final mixture. This acidification step can alter the stability of additives during formulation or storage (especially if their stability is altered when the pH in their micro-environment is modulated). As such, the acidification step limits the type of additives which can be included in the composition and/or the timing for introducing such additives during the process.

It would be highly desirable to be provided with a process for including complex natural carbohydrates in a chewable product. It would also be desirable to be provided with a process which includes a single boiling step. In some applications, it would be advantageous that the process fails not rely on the addition of an acidifying agent to form a gel in order to include different types of additives in the chewable product. Also, since different gelling agents can achieve different mouth feels of chewable products, in some embodiments, the process would preferably accommodate including different gelling agents to provide an array of different mouth feels.

BRIEF SUMMARY

The present disclosure provides processes for making a chewable product using a complex natural carbohydrate. As shown herein, the process includes providing the complex carbohydrate in a modified form (i.e., either dehydrated or supplemented form) prior to its incorporation in the chewable product. The present disclosure also provides chewable products obtained therefrom as well as uses of the chewable product.

In a first aspect, the present disclosure provides a process for making a chewable product. Broadly, the process comprises (a) providing a heated and liquefied complex carbohydrate composition, wherein the heated and liquefied complex carbohydrate composition; (b) combining a boiling liquid glucose composition and the heated and liquefied complex carbohydrate composition to obtain a first mixture; (c) adding at least one gelling agent to the first mixture to obtain a second mixture, wherein the gelling agent is selected from the group consisting of pectin, gelatin and a mixture of pectin and gelatin; and (d) cooling the second mixture to ambient temperature to obtain the chewable product. In the process described herein, after step (b), boiling the second mixture is avoided. Also in the processes described herein, the heated and liquefied complex carbohydrate composition is obtained by (i) substantially dehydrating a complex carbohydrate to obtain a dried complex carbohydrate; or (ii) supplementing the complex carbohydrate with a first carbohydrate to obtain a supplemented complex carbohydrate; and (iii) heating the dried complex carbohydrate and/or the supplemented complex carbohydrate to obtain the heated and liquefied complex carbohydrate composition. In an embodiment, the complex carbohydrate is at least one of a honey composition, a honey and maple syrup composition, an agave composition, a molasses composition and combinations thereof. In another embodiment, the first carbohydrate is a di-saccharide, such as, for example, sucrose. In still another embodiment, the gelling agent comprises or consists of pectin and the process further comprises adding pectin to a boiling first mixture. In such embodiment, the process can further comprise admixing the liquid glucose composition with a gel retardant, prior to step (b); and/or admixing pectin with a second carbohydrate (such as, a di-saccharide, for example sucrose) prior to step (c). In still another embodiment, the gelling agent consists of pectin and gelatin. In such embodiment, the process can further comprise adding a suspension comprising gelatin to a boiled first mixture. In yet another embodiment, the gelling agent consists of gelatin. In such embodiment, the process can further comprise adding gelatin in an hydrated form to a boiled first mixture; and/or combining an aqueous solution and gelatin so as to obtain a gelatin mixture and heating (at a temperature of about 50° C. to about 75° C. for example) the gelling mixture to obtain gelatin in the hydrated form. Further, in such embodiment, the liquid glucose composition consists essentially of glucose and water. In yet another embodiment, the process can further comprise, at step (i), heating the dehydrated complex carbohydrate or the supplemented complex carbohydrate to a temperature of about 94° C. to about 100° C. In still another embodiment, the process can further comprise, prior to step b), heating the liquid glucose composition to a temperature of about 105° C. to about 122° C. In still a further embodiment, the process can further comprise combining a flavoring agent with the first mixture and/or the gelling agent. In yet another embodiment, the process can still further comprise combining an active ingredient with the first mixture and/or the gelling agent. In another embodiment, the process can comprise, prior to step (d), applying a vacuum to the second mixture.

In a second aspect, the present disclosure provides a chewable product obtained by the process described herein. In an embodiment, the chewable product can essentially consists in a mixture of a complex carbohydrate, glucose and at least one of the following gelling agent forming a gel: gelatin and optionally a first carbohydrate, a second carbohydrate and a gel retardant when pectin is present. In an embodiment, the complex carbohydrate is honey. In another embodiment, the first carbohydrate and/or the second carbohydrate are different or the same. In a further embodiment, the first carbohydrate and/or the second carbohydrate is a di-saccharide such as sucrose. In still another embodiment, the chewable product is a single-layered and uncoated product, has an homogeneous texture and/or is a gummy.

In a third aspect, the present disclosure provides a delivery system for an active ingredient, said delivery system comprising the chewable product described herein and the active ingredient. In an embodiment, the active ingredient is at least one of a vitamin, a mineral and a combination thereof.

In a fourth aspect, the present disclosure provides a process for making a chewable honey product. The process broadly comprises: a) individually heating i) a substantially dehydrated honey composition to obtain a liquefied honey composition; and ii) a liquid glucose composition to obtain a heated liquid glucose composition; b) combining the liquefied honey composition with the heated glucose composition to obtain a first mixture; c) boiling the first mixture to obtain a first boiled mixture; d) combining the first boiled mixture with a gelling solution to obtain a second mixture, wherein the gelling solution comprises an hydrated gelatin solution; and e) cooling the second mixture to ambient temperature to obtain the chewable honey product; wherein the process (i) avoids adjusting the pH to obtain the second mixture and (ii) avoids, after step c), boiling of the second mixture. In an embodiment, step a) further comprises heating the substantially dried and solid honey composition to a temperature between 94° C. and 100° C. In another embodiment step a) further comprises heating the liquid glucose composition to a temperature between 105° C. and 122° C. In still another embodiment, the glucose composition is a glucose syrup. In yet another embodiment, the boiling of step c) is conducted at a temperature between 105° C. and 120° C. In yet another embodiment, the gelling solution is obtained by combining an aqueous solution and gelatin so as to obtain a gelatin mixture and heating the gelling mixture so as to hydrate the gelatin, and in still a further embodiment, the process further comprises heating the gelatin mixture to a temperature between 50° C. to 75° C. (and in yet a further embodiment to a temperature of about 70° C.) to obtain a heated gelatin mixture. In some embodiments, the process further comprises cooling the heated gelatin mixture at ambient temperature. In yet another embodiment, the process further comprises adding a stabilizer to the gelling solution (such as, for example, a polysaccharide (e.g., pectin) and/or a sugar alcohol (e.g., sorbitol)). In another embodiment, step d) further comprises combining a flavoring agent with the first boiled mixture and/or the gelling solution. In still another embodiment, step d) further comprises combining an active ingredient with the first boiled mixture and/or the gelling solution. In yet another embodiment, the process further comprises, after step d) and before step e), applying a vacuum to the second mixture.

In a fifth aspect, the present disclosure provides a chewable honey product obtained by the process described herein and/or a chewable honey product consisting essentially of honey, gelatin and glucose, optionally in combination with a stabilizer and/or a flavoring agent. In an embodiment, the stabilizer is a polysaccharide (e.g., pectin) and/or a sugar alcohol (e.g. sorbitol). In another embodiment, the chewable honey product is a single-layered and uncoated product. In yet another embodiment, the chewable honey product has an homogeneous texture. In still a further embodiment, the chewable honey product is a gummy.

In a sixth aspect, the present disclosure provides a delivery system for an active ingredient. The delivery system comprises the chewable honey product described herein and the active ingredient. In an embodiment, the active ingredient is at least one of a vitamin, a mineral and a combination thereof.

BRIEF DESCRIPTION OF THE DRAWINGS

Having thus generally described the nature of the invention, reference will now be made to the accompanying drawings, showing by way of illustration a preferred embodiment thereof, and in which.

DETAILED DESCRIPTION

Figure 1:
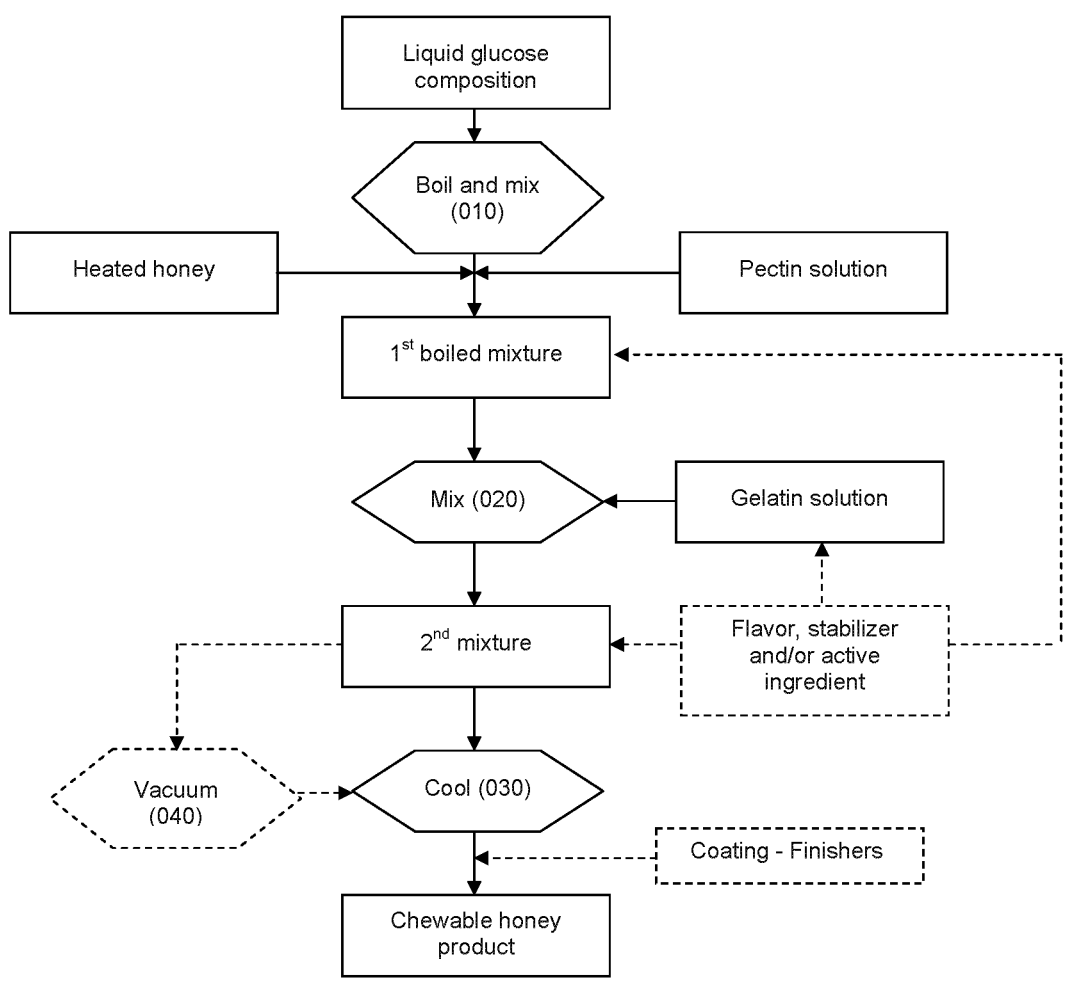
FIG. 1 illustrates an embodiment of the process for making the chewable products in which pectin and/or gelatin can be used as gelling agents. In this figure, honey is used as the source of conditioned complex carbohydrate.

In accordance with the present disclosure, there is provided a process which conditions complex carbohydrates prior to their addition in a chewable product. More specifically, the process conditions the complex carbohydrate in a dehydrated or supplemented form prior to its combination with glucose and/or a gelling agent. The process includes a single boiling step and, in some embodiments, does not rely on the addition of an acidifying agent for making a chewable product. Further, the process also provides more flexibility in selecting gelling agents and/or additives since less stress is applied to the components during the manufacturing/formulation.

In the chewable products described herein, the complex carbohydrate is the major ingredient (on a weight basis).

Process for Making the Chewable Product

The process described herein allows for the production of a chewable product made from a a complex carbohydrate composition. As used herein, the term "complex carbohydrate" refers to a mixture of more than one type of carbohydrates, generally in combination with non-carbohydrate components in trace amounts (minerals, proteins or peptides, lipids, etc.). Known complex carbohydrates include natural complex carbohydrate such as honey, maple syrup, agave, molasses and the like.

In the process described herein, the complex carbohydrate can be conditioned in a substantially dehydrated form. As used herein, the term "substantially dehydrated" refers to a composition comprising less than 1%, 0.5%, 0.4%, 0.3%, 0.2% or 0.1% moisture (weight of water/weight of the total composition). In an embodiment, the "substantially dehydrated complex carbohydrate" is from a natural source and has been manufactured from a solution (such as a syrup) to a substantially dehydrated form. The process can be applied to various substantially dehydrated complex carbohydrate compositions, such as, for example, a substantially dehydrated honey composition (for example, as described in international application PCT/CA2010/000058 filed on Jan. 15, 2010 and published under WO/2010/081232 on Jul. 22, 2010), a substantially dehydrated honey and maple syrup composition (for example, as described in international application PCT/CA2013/050537 filed on Jul. 11, 2013 and published under WO/2014/008602 on Jan. 16, 2014), a substantially dehydrated agave composition (for example, as described in international application PCT/CA2013/050538 filed on Jul. 11, 2013 and published under WO/2014/008603 on Jan. 16, 2014) and/or a substantially dehydrated molasses composition (for example, as described in international application PCT/CA2014/050112 filed on Feb. 19, 2014 and published under WO2014/127474 on Aug. 28, 2014).

In the process described herein, the complex carbohydrate can be provided in a supplemented form. In the context of the present disclosure, the supplemented form of a complex carbohydrate refers to the addition of a defined carbohydrate to the complex carbohydrate prior to any heating steps. Defined carbohydrates include monosaccharide (such as glucose, fructose and galactose), disaccharide (such as sucrose, lactulose, lactose, maltose, trehalose and cellobiose), polysaccharides (such as cellulose, starch and inulin) as well as derivatives (inulin fibers for example). The weight ratio of the weight of the defined carbohydrate to the total weight of the complex carbohydrate and defined carbohydrate can be modulated depending on the intended use. In some embodiment, the weight ratio is any ratio between 20% and 40%.

In the process described herein, it is contemplated to use a substantially dehydrated complex carbohydrate, a supplemented complex carbohydrate or a combination of a substantially dehydrated complex carbohydrate, a supplemented complex carbohydrate for making the chewable product.

Once the complex carbohydrate has been conditioned (either by dehydration or supplementation), it is heated to be provided in a heated and liquid form. In some embodiments, no further liquid is added to the condition complex carbohydrate during this heating step. Also, in some instances, to preserve the organoleptic properties of the complex carbohydrate, the conditioned complex carbohydrate is heated to any range of temperature between at least 70° C. and 100° C.

FIG. 1 provides an overall view of the process for making the chewable product using honey as a source of complex carbohydrate. While being boiled (at step 010), a liquid glucose composition is admixed with conditioned honey and at least one gelling agent to generate a first mixture. The process can include using pectin, gelatin or a mixture of pectin and gelatin as gelling agents. When pectin is used as a gelling agent, it is being added to the boiling liquid glucose composition to generate the first boiled mixture. When gelatin is used as a gelling agent, it is being added (at step 020) to the first boiled mixture (which has preferably been removed from heat) to generate a second mixture. The resulting mixture can be optionally be vacuumed (at step 040) and is ultimately cooled (at step 030) to provide the chewable products. In such process, to maintain the flowability of the mixture prior to deposition, it may be desirable to maintain the temperature of the first mixture and/or the second mixture to at least 65° C., 70° C. or 75° C.

The liquid glucose composition (which can be used in combination with any conditioned complex carbohydrate) can be, for example, a glucose syrup (having, for example, 42 to 43 DE). In some embodiments, the liquid glucose composition can be used without any further additions. However, in some embodiment, the liquid glucose can include other carbohydrates, such as, for example, monosaccharide (such as glucose, fructose and galactose), disaccharide (such as sucrose, lactulose, lactose, maltose, trehalose and cellobiose), polysaccharides (such as cellulose, starch and inulin) as well as derivatives (inulin fibers for example). When additional carbohydrates are present, the weight ratio (w/w) between the weight of glucose and the weight of the liquid glucose composition is at least 50%, at least 60%, at least 70%, at least 80%, at least 90%, at least 95% or at least 99%. When pectin or a combination of pectin and gelatin are used as gelling agents, the liquid glucose composition can also include an acidic salt as a gel retardant, such as sodium citrate, potassium citrate and/or phosphates, to help retard the formation of the pectin gel. In an embodiment, the weight ratio between the weight of the gel retardant and the total weight of the liquid glucose composition can be any range between 0.1% to 10%. When gelatin is used as the sole gelling agent, the liquid glucose composition does not necessarily include an acidic salt.

Then, the liquid glucose composition is boiled. The boiling step 010 ensures that the liquid glucose composition will be homogeneously admixed with the remaining ingredient. In an embodiment, the liquid glucose composition is heated at a temperature of at least 105° C. but no more than 122° C. (preferably, between 110° C. and 120° C., and even more preferably at 115° C.). In an embodiment, the liquid glucose composition is boiled at a temperature of at least 105° C., 106° C., 107° C., 108° C., 109° C., 110° C., 111° C., 112° C., 113° C., 114° C., 115° C., 116° C., 117° C., 118° C., 119° C., 120° C. or 121° C. and/or no more than 122° C., 121° C., 120° C., 119° C., 118° C., 117° C., 116° C., 115° C., 114° C., 113° C., 112° C., 111° C., 110° C., 109° C., 108° C., 107° C. or 106° C. The person of ordinary skill in the art will recognize that such temperature is not limitative and can be adjusted depending on the type of the liquid glucose composition used as well as the environmental conditions. In the process shown in FIG. 1, the liquid glucose composition can be kept at a pre-determined boiling temperature (for example at a temperature between 110° C. and 120° C., for example 115° C.), until it is admixed with the liquid heated complex carbohydrate and, optionally, the pectin.

The conditioned complex carbohydrate (such as conditioned honey) is first pre-heated (not shown in FIG. 1) and then admixed to the boiling liquid glucose composition. The conditioned complex carbohydrate can be pre-heated before the liquid glucose composition is boiled, after before the liquid glucose composition is boiled or at about the same time the liquid glucose composition is boiled. In the process shown in FIG. 1, the conditioned complex carbohydrate is kept in a liquefied/heated form until it is admixed with the boiled liquid glucose composition.

In an embodiment, a substantially dehydrated honey is heated until it liquefies and forms a liquid honey composition. In some embodiments, and depending on the environmental conditions and the nature of the substantially dehydrated honey composition, liquefaction can be achieved when the temperature of the composition reaches at least 94° C. and no more than 100° C. (preferably 96° C.). In an embodiment, the substantially dehydrated carbohydrate composition reaches at least 94° C., 95° C., 96° C., 97° C., 98° C., 99° C. and/or is no more than 100° C., 99° C., 98° C., 97° C., 96° C. or 95° C. When liquefying the dehydrated honey, care should be taken in heating the substantially dehydrated honey composition at a rate and to a temperature which will not modify the organoleptic properties of the substantially dehydrated honey composition. For example, care should be taken in avoiding the introduction of a burnt flavor. In the dehydrated honey liquefaction step, no exogenous liquids are added to favor the liquefaction of the substantially dehydrated honey composition. In another embodiment, in the dehydrated honey liquefaction step, no pH modifying agents (such as an acidifying agent) are added. In still another embodiment, the liquefied dehydrated honey is not supplemented with another ingredient.

In another embodiment, when liquid honey is intended to be incorporated in the boiling liquid glucose composition, it is first admixed with a carbohydrate (such as a monosaccharide, a disaccharide, a polysaccharide or a derivative thereof) and then heated/stirred to dissolve the carbohydrate. The carbohydrate that can be combined with any of the complex carbohydrates, and especially with honey, include monosaccharide (such as glucose, fructose and galactose), disaccharide (such as sucrose, lactulose, lactose, maltose, trehalose and cellobiose), polysaccharides (such as cellulose, starch and inulin) as well as derivatives (inulin fibers for example). In an embodiment, the carbohydrate combined to supplement the complex carbohydrate is a disaccharide such as sucrose. In some embodiments, and depending on the environmental conditions and the nature of the liquid complex carbohydrate, carbohydrate dissolution can be achieved when the temperature of the composition reaches at least 70° C. and no more than 85° C. In an embodiment, the supplemented complex carbohydrate is heated at a temperature of at least 70° C., 71° C., 72° C., 73° C., 74° C., 75° C., 76° C., 77° C. 78° C., 79° C., 80° C., 81° C., 82° C., 83° C. or 84° C. and/or is no more than 85° C., 84° C., 83° C., 82° C., 81° C., 80° C. 79° C., 78° C., 77° C., 76° C., 75° C. 74° C., 73° C., 72° C. or 71° C. In still another embodiment, the liquid honey and sucrose are heated to any temperature ranges between 70° C. and 85° C. When heating the supplemented complex carbohydrate, care should be taken in heating the resulting mixture at a rate and to a temperature which will not modify the organoleptic properties of the complex carbohydrate. For example, care should be taken in avoiding the introduction of a burnt flavor. Once the carbohydrate has been dissolved in the liquid complex carbohydrate, the supplemented complex carbohydrate can be admixed with the boiling liquid glucose composition.

To generate the first mixture, the liquefied/heated complex carbohydrate is added to the boiling liquid glucose composition. In another embodiment, the boiling liquid glucose composition is added to the liquefied/heated complex carbohydrate. In yet another embodiment, the liquefied/heated complex carbohydrate can be added relatively simultaneously to the boiling liquid glucose composition in a vessel. The ingredients of step 010 can be admixed in the vessel in which the complex carbohydrate was liquefied/heated, in the vessel in which the liquid glucose was boiled or in another vessel which was not used to liquefy/heat the complex carbohydrate or boil the liquid glucose composition. Further, in step 010, it is not necessary to apply a further heating to the components to obtain an homogeneous mixture. However, in some embodiments, it may be beneficial to keep the first mixture at a pre-determined boiling temperature (for example 115° C.) to favor the formation of an homogeneous mixture and/or to facilitate subsequent manufacturing steps.

When pectin is used as a gelling agent in the manufacture of the chewable product, it is being added to the boiling liquid glucose composition (preferably to a liquid glucose composition comprising a gel retardant such as an acidic salt). Pectin, usually in the form of powder, can be added before the liquefied/heated complex carbohydrate is admixed with the boiling glucose composition, after the liquefied/heated complex carbohydrate is admixed with the boiling liquid glucose composition or about at the same time the liquefied/heated complex carbohydrate is added to the boiling glucose solution. Prior to its addition to the boiling glucose solution, pectin can be admixed with a carbohydrate such as a monosaccharide (such as glucose, fructose and galactose), a disaccharide (such as sucrose, lactulose, lactose, maltose, trehalose and cellobiose), a polysaccharides (such as cellulose, starch and inulin) or a derivative thereform (inulin fibers for example). In some embodiment, the carbohydrate is a disaccharide such as sucrose. In another embodiment, the carbohydrate is a derivative such as inulin fibers.

Boiling step 010 is preferably maintained until the first mixture has lost about 1 to 5% moisture (preferably between about 4 to 5% moisture) and has begun to slightly thicken. In an embodiment, the boiled first mixture has lost, with respect to the un-boiled first mixture, at least 1%, 2%, 3%, 4% or 5% moisture. Alternatively or in combination, the first boiled mixture has lost, with respect to the un-boiled first mixture, no more than 5%, 4%, 3%, 2% or 1%. In still another embodiment, the first boiled mixture has lost any range of moisture between 1 and 5% (when compared to the original mixture prior to the boiling step).

In an embodiment, at step 010, the first mixture is heated to a temperature of at least 105° C. but no more than 120° C. (preferably 107° C.). In an embodiment, the first mixture is heated to a temperature of at least 105° C., 106° C., 107° C. 108° C., 109° C., 110° C., 111° C., 112° C., 113° C., 114° C., 115° C., 116° C., 117° C., 118° C. or 119° C. and/or no more than 120° C., 119° C., 118° C., 117° C., 116° C., 115° C., 114° C., 113° C., 112° C., 111° C., 110° C., 109° C., 108° C., 107° C. or 106° C. In another embodiment, the first mixture is heated to any range of temperature between 105° C. and 120° C. The person of ordinary skill in the art will recognize that such boiling temperature is not limitative and can be adjusted depending on the type of ingredients being used as well as the environmental conditions. When boiling the first mixture at step 010, care should be taken in heating the mixture at a rate and to a temperature which will not modify the organoleptic properties of the complex carbohydrate (e.g., will not introduce a burnt flavor, for example). In an embodiment, especially when pectin is not used as a gelling agent, in step 010, no pH modifying agents (such as an acidifying agent) are added.

The process described herein has a single boiling step. Once boiling step 010 has been completed, no further boiling steps are included in the process. However, as it will be explained below, it may be required that further heat be applied to the resulting mixtures. Such application of heat will not result in the boiling of the ingredients of the first and/or second mixture.

Once the ingredients of the first mixture have been combined, they are further stirred/heated under conditions so as to allow the generation of a first mixture. The first mixture obtained is preferably an homogeneous one (e.g., having a single liquid phase). In some embodiments, especially when pectin is not used as a gelling agent, in step 010, no pH modifying agents (such as an acidifying agent) are added to the first mixture.

Once the first mixture has been boiled, and in embodiments in which gelatin is used as a gelling agent, it can be admixed with gelatin solution at step 020 to obtain a second mixture. Step 020 can be conducted in the same vessel used in step 010, in the vessel used to prepare the gelatin solution (see below) or in another vessel. In some embodiments, especially when one or more of the components of the gelling solution are temperature-sensitive, it may be necessary to cool the first boiled mixture (from its boiling temperature) prior to admixing it with the gelatin solution. In an embodiment in which pectin and gelatin are used as gelling agents, the first mixture is removed from heat and admixed with gelatin (in an non-hydrated form). In another embodiment when gelatin is used as the sole gelling agent, the first mixture is removed from heat and admixed with gelatin in an hydrated form. In step 020, no further boiling is applied to form the second mixture or to the second mixture which has been formed. However, further heat can be applied to the second mixture to maintain its flowability prior to deposition. Further, in an embodiment, especially when pectin is not used as a gelling agent, in step 020, no pH modifying agents (such as an acidifying agent) are added to allow or facilitate the formation of a chewable gel.

Optionally (as shown in dotted lines on FIGS. 1 to 4), flavoring agents, active ingredients and/or stabilizers can be included in the chewable product. Such optional ingredients can be added to the gelatin solution, to the first boiled mixture, to a cooled first boiled mixture and/or to the second mixture (during its formation or after its formation). In order to incorporate the optional ingredients in the solution/mixture, it may be necessary to gently mix the solution/mixture so as not to introduce air bubbles in the solution/mixture. In some embodiments, when the optional ingredients are temperature-sensitive, it may be advisable to add them to a solution or mixture which will not be submitted to a further heating step or which has been cooled. In an embodiment, the flavoring agent and/or active ingredient is added with the gelling solution to the first boiled mixture. In another embodiment, the stabilizer is added in the gelling solution (and in some embodiments, when the gelling agent has been hydrated).

Once the second mixture has been formed, it is cooled at ambient temperature at step 030 to allow the formation of an hydrated gel to obtain the chewable product. As used herein, the term ambient temperature (also referred to as room temperature) encompasses a range of temperature between 14° C. and 30° C. and in some embodiment between 14° C. and 18° C. In an embodiment, the cooling step 030 is performed at least partially in a mold and as such, the process includes pouring the second mixture in a mold. In step 030, the cooling may be assisted by ventilation, by refrigeration or any other means capable of reducing the temperature of the second mixture. Once cooled, the chewable products can be further processed (de-molded, cut, coated and/or packaged). In an embodiment, especially when pectin is not used as a gelling agent, in step 030, no pH modifying agents (such as an acidifying agent) are added to allow or facilitate the formation of a chewable gel.

Optionally, as show in dotted lines on FIG. 1, once the chewable product is cooling and/or has been deposited, it can be further processed using finishers or coats. For example, deposited chewable products can be coated with a glaze (such as an oil-based glaze), granules (such as dextrose granules), wax (such as bee's wax) to provide further mouth feels to the chewable product.

In some embodiments, and as shown in FIG. 1, the process can also include an optional vacuum step 040 to lower the moisture content of the chewable product and/or remove or limit the formation of air bubbles in the chewable product. In FIG. 1, a vacuum step 040 is applied to the second mixture. The vacuum is applied until a certain moisture content of the second mixture is achieved (for example, less than 30%, 29%, 28%, 27%, 26%, 25%, 24%, 23%, 22%, 21%, 20%, 19%, 18%, 17%, 16%, 15%, 14%, 13%, 12%, 11% or 10% moisture, or any range between 14 to 26% moisture (w/w ratio of water with respect to the total weight of the final product)) and/or until the air bubbles which may have been present in the second mixture can no longer be detected visually. In an embodiment, the vacuum applied to the second mixture is at least 28 inHg. The person of ordinary skill in the art will recognize that such vacuum intensity is not limitative and that other ranges are contemplated to achieve the same goal. In step 040, it is not necessary to apply a further heating step or a cooling step to the vacuumed second mixture. However, step 040 can include alterations in temperatures or the maintenance at a certain temperature to facilitate water removal and/or air bubble removal. In step 040, no further boiling is applied to the second mixture. Further, in some embodiment especially when pectin is not used as a gelling agent, in step 040, no pH modifying agents (such as an acidifying agent) are added to allow or facilitate the formation of a chewable gel.

Figure 2:
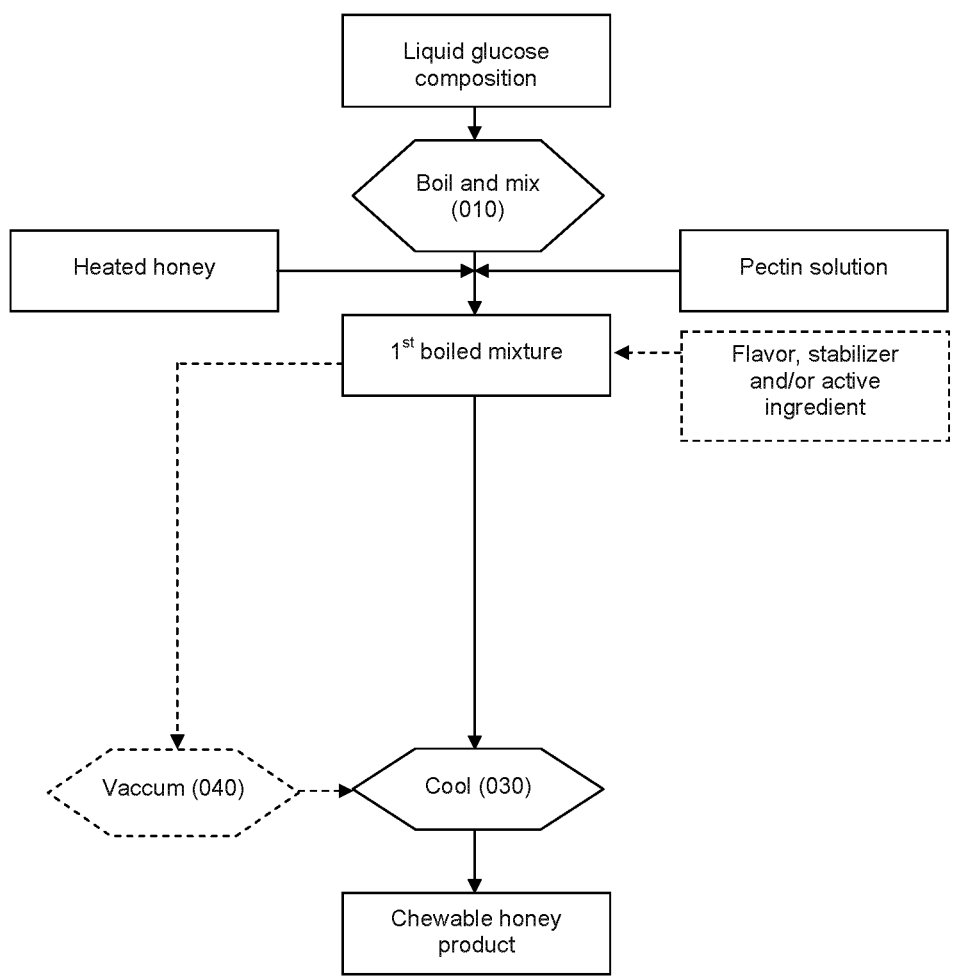
FIG. 2 illustrates an embodiment of the process for making the chewable honey products in which pectin is used as the sole gelling agent. In this figure, honey is used as the source of conditioned complex carbohydrate.

FIG. 2 illustrates an embodiment of the process in which pectin is used as the sole gelling agent and honey as the source of the conditioned complex carbohydrate. In this embodiment of the process, the liquid glucose composition comprises a gel retardant (such as an acidic food grade salt) is first boiled at step 010 at a temperature between 105° C. and 122° C. Liquefied/heated honey (which can comprise a di-saccharide such as sucrose) and pectin (which can comprise a di-saccharide such as sucrose) are being added and mixed to the boiling liquid glucose composition. Once the first mixture has been boiled and reached the desired moisture content, flavor(s), stabilizer(s) and/or active ingredient(s) can be added. The resulting mixture can optionally be submitted to a vacuum step (040) prior being cooled at room temperature (030) to make the chewable product. Optionally, the resulting chewable product can further be processed to include a coating (not shown on FIG. 2).

Figure 3:
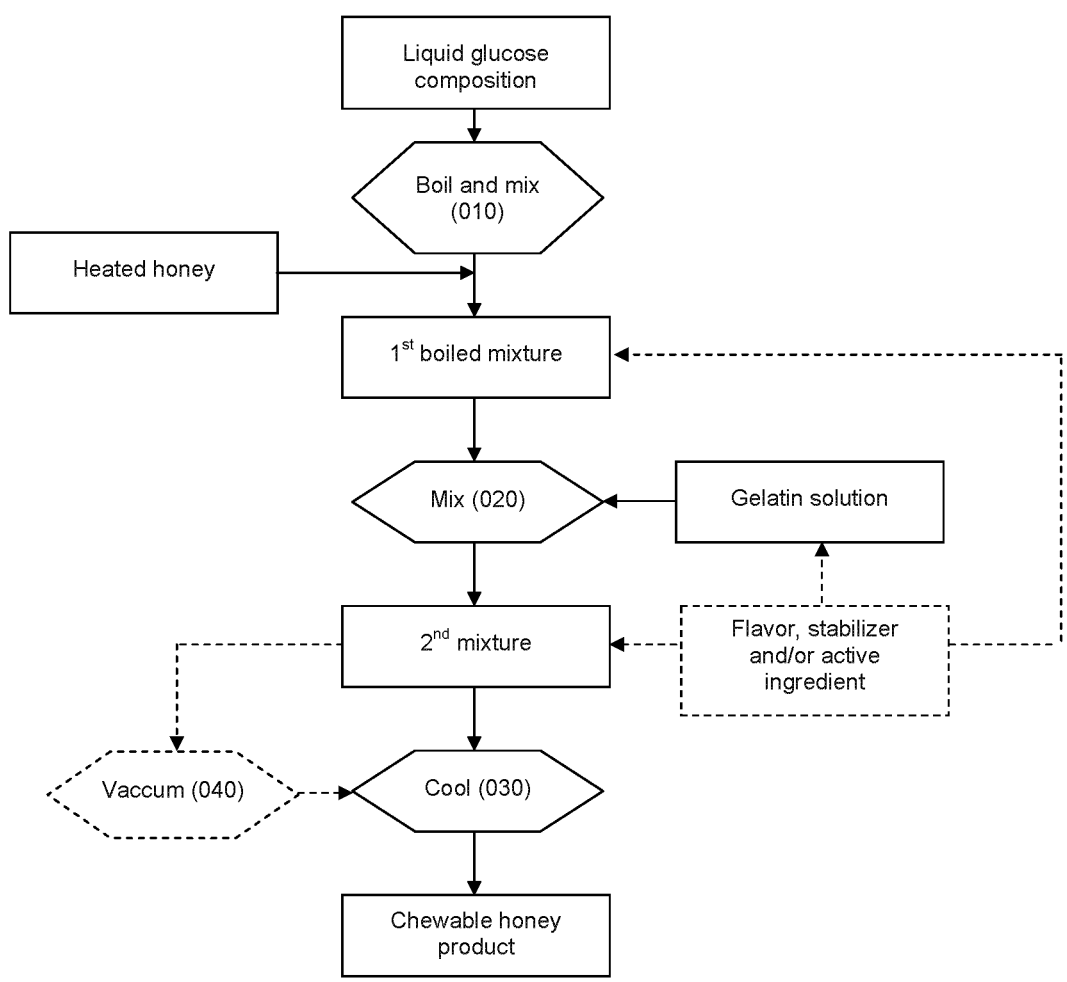
FIGS. 3 and 4 illustrate embodiments of the process for making chewable honey products in which gelatin is used as the sole gelling agent. In this figure, honey is used as the source of conditioned complex carbohydrate.

FIG. 3 illustrates an embodiment of the process in which gelatin is used as the sole gelling agent and honey as the source for the conditioned complex carbohydrate. In this embodiment of the process, the liquid glucose composition does not necessarily include a gel retardant (such as an acidic food grade salt). The liquid glucose composition is first boiled at step 010 at a temperature between 105° C. and 122° C. Liquefied/heated honey (which can comprise a di-saccharide such as sucrose) is being added and mixed to the boiling liquid glucose composition to provide a first mixture. Once the first mixture has been boiled and reached the desired moisture content, an hydrated gelatin solution is admixed (at step 020) to generate a second mixture. Flavor(s), stabilizer(s) and/or active ingredient(s) can be added either to the first boiled mixture, the gelatin solution of the second mixture. The second mixture can optionally be submitted to a vacuum step (040) prior being cooled (030) to make the chewable product. Optionally, the resulting chewable product can further be processed to include a coating (not shown on FIG. 3).

Figure 4:
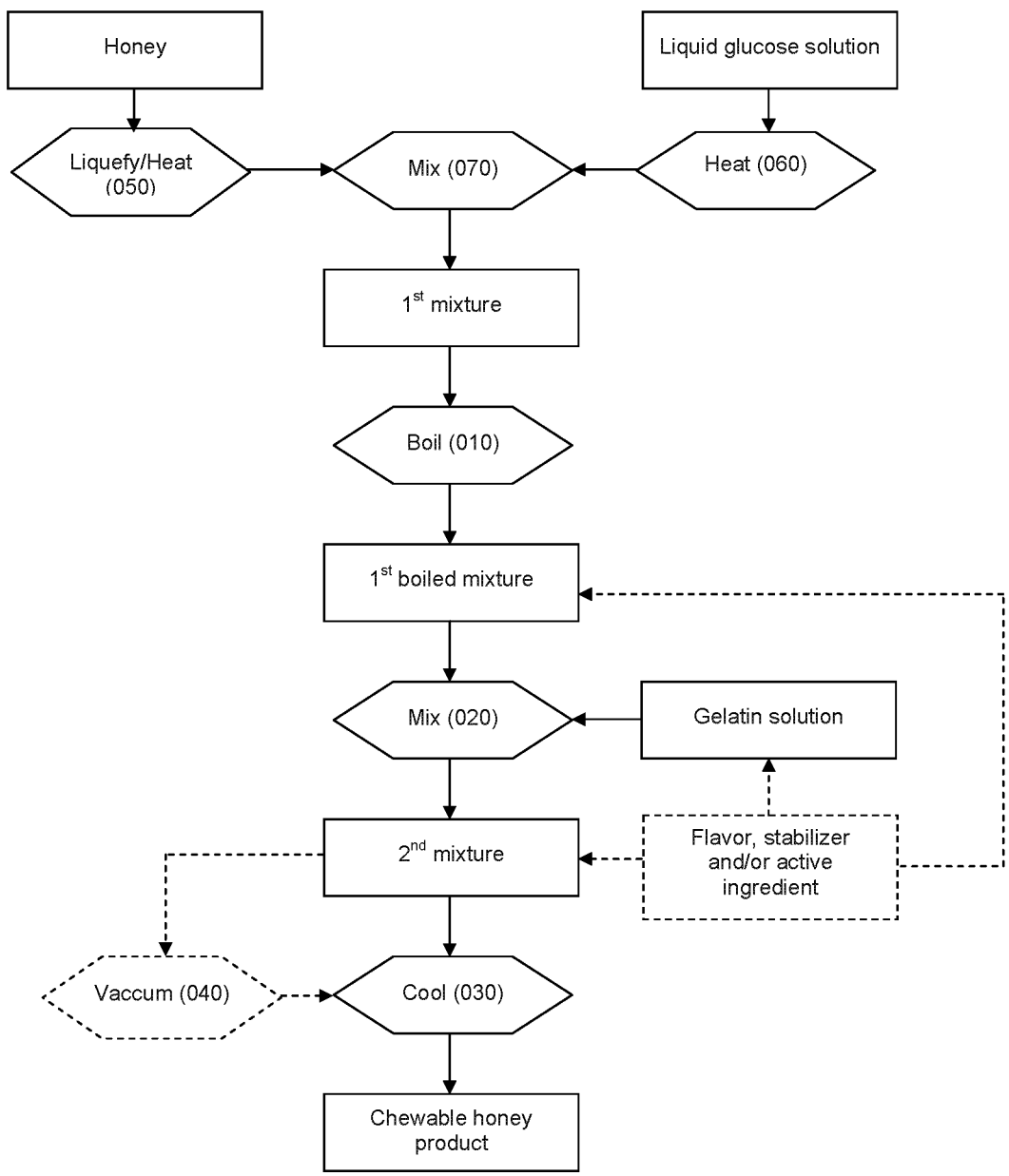

FIG. 4 illustrations a further embodiment of the process in which gelatin is used as the sole gelling agent and honey as the source of the conditioned complex carbohydrate. In this embodiment of the process, at step 050, substantially dehydrated honey (which does not comprise a di-saccharide such as sucrose) is liquefied or liquid honey (which does comprise a di-saccharide such as sucrose) is heated to a temperature between about 70 to 85° C. At step 060, the liquid glucose composition (which does not comprises a gel retardant (such as an acidic food grade salt)) is heated. The heated/liquefied honey and liquid glucose composition are then mixed (step 070) to generate a first mixture and boiled (step 010) to generate a first boiled mixture. Once the first mixture has been boiled and reached the desired moisture content, a gelatin solution is admixed (at step 020) to generate a second mixture. Flavor(s), stabilizer(s) and/or active ingredient(s) can be added either to the first boiled mixture, the gelatin solution of the second mixture. The second mixture can optionally be submitted to a vacuum step (040) prior being cooled (030) to make the chewable product. Optionally, the resulting chewable product can further be processed to include a coating (not shown on FIG. 4).

Figure 5:
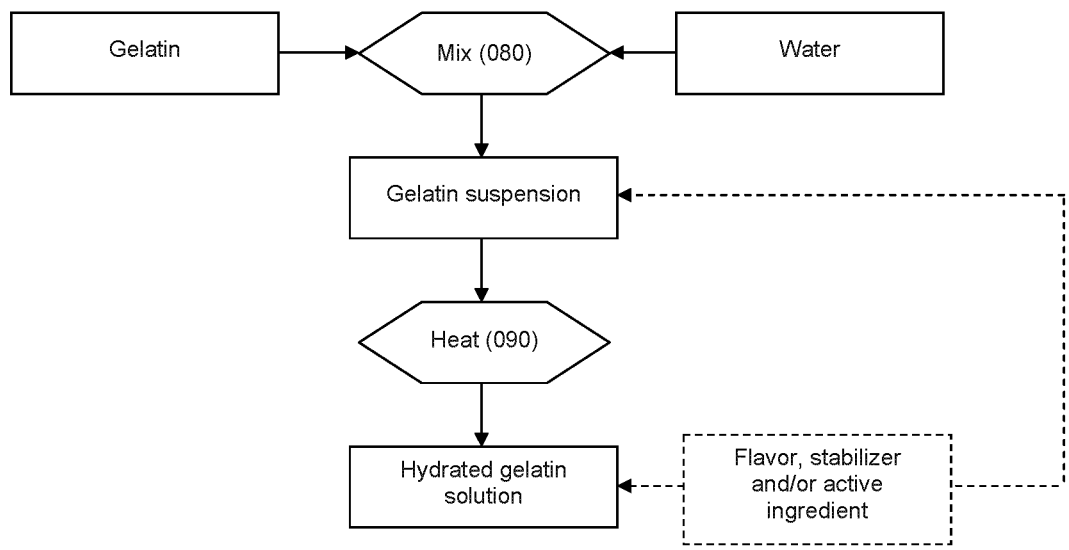
FIG. 5 illustrates an embodiment of the process for making the gelatin solution.

FIG. 5 illustrates a sub-section of the process for making the gelatin solution (when gelatin is used as the sole gelling agent). The gelatin solution used at step 020 of FIGS. 3 and 4 can be obtained is obtained by hydrating a gelling agent. In order to obtain a gelling solution, an agent capable of forming an hydrogel (e.g., a gelling agent) is admixed, at step 080, with an aqueous solution (e.g., water) to form a suspension. Gelatin is usually provided in a powder form and will not readily dissolve nor hydrate if it is admixed in an aqueous solution at ambient temperature. As such, the gelling agent suspension is heated, at step 090, to a temperature which will allow the dissolution of the gelling agent as well as its hydration. For example, gelatin can be heated to a temperature between 50° C. and 75° C. (and in some embodiments 70° C.) to allow its hydration. For example, the gelatin can be heated to a temperature of at least 50° C., 51° C., 52° C., 53° C., 54° C., 55° C., 56° C., 57° C., 58° C., 59° C., 60° C., 61° C., 62° C., 63° C., 64° C., 65° C., 66° C., 67° C., 68° C., 69° C., 70° C., 71° C., 72° C., 73° C. or 74° C. and/or of no more than 75° C., 74° C., 73° C., 72° C., 71° C., 70° C., 69° C., 68° C., 67° C., 66° C., 65° C., 64° C., 63° C., 62° C., 61° C., 60° C., 59° C., 58° C., 57° C., 56° C., 55° C., 54° C., 53° C., 52° C. or 51° C. Once hydrated, the gelling agent is capable of forming an hydrated gel upon the cooling of the gelling solution at lower temperatures (e.g., ambient temperature). Those skilled in the art understand that some gelling agents, especially gelatin, can be temperature-sensitive. As such, step 090 must be conducted in such a way that the heating step does not mitigate the properties (e.g., denature) of the hydrated gelling agent to form an hydrated gel. When gelatin is used as a gelling agent, the step 090 can be conducted at a temperature of about 70° C. and for a time sufficient to allow the dissolution and the hydration of the gelatin. Those skilled in the art will realize that such temperature is exemplary and is not limitative. In the process described in FIG. 5, it is important to note that boiling of the ingredients is avoided.

In some embodiments, optional ingredients can be incorporated in the gelling solution (components in dotted lines on FIG. 5). Such optional ingredients include, but are not limited to, stabilizers (such as polysaccharides and/or sugar alcohols), flavoring agents and/or active ingredients. These optional ingredients can be added during step 080 or step 090, or both. If an optional ingredient is temperature sensitive, it may be possible to add it to the gelling solution only after heating step 090, when the gelling solution has reached a pre-determined temperature which will not materially affect the properties of the optional ingredients. In an embodiment, the gelatin solution can be cooled to form a gel and then further homogenized to be admixed with the first boiled mixture and/or the optional ingredients.

Chewable Product

The processes described herein allow the generation of chewable products manufactured using a conditioned complex carbohydrate (for example, a substantially dehydrated or supplemented complex carbohydrate). In an embodiment, the chewable product is a confectionary. As used herein, the term "chewable product" refers to a product which can be chewed (e.g., work the jaws and teeth in order to grind the product and/or bitten repeatedly). Exemplary chewable products include, but are not limited to, soft chews, chewable gummy candy or "gummy" confections as well as soft candies (e.g., gum drops, licorice, fruit snacks, starch-based jellies, gelatin-based jellies, pectin-based jellies, carageenan-based jellies, agar-based jellies, konjac-based jellies, chewy candy, starch candy, nougat, toffee, taffy, marshmallow, fondant, fudge, chocolate, compound coating, carob coating, caramel, compressed tablets, candy floss (also known as cotton candy), marzipan, hard boiled candy, nut brittles, pastilles, pralines, nonpareils, dragees, lozenges, sugared nuts, comfits, aniseed balls, nougatine, and jelly beans).

The chewable product described herein can be a single-layered and uncoated product. Alternatively, the chewable product can be a coated (single- or multiple-coated) product. In yet another embodiment, the chewable product can be used to form a coat at least partially covering another confectionary. Once obtained, the chewable product can be easily handled, cut, packaged or further processed depending on the intended use.

In an embodiment, the chewable product consists essentially of a complex carbohydrate, glucose and at least one gelling agent selected from the group consisting of pectin and gelatin. In the chewable product, the gelling agent forms a gel. When pectin is used as a gelling agent (either alone or in combination with gelatin), the chewable product also includes a further carbohydrate and a gel retardant (such as an acidic food-grade salt). Such additional carbohydrate can include a monosaccharide (such as glucose, fructose and galactose), a disaccharide (such as sucrose, lactulose, lactose, maltose, trehalose and cellobiose), a polysaccharides (such as cellulose, starch and inulin) or a derivative thereform (inulin fibers for example). In some embodiments, the carbohydrate is a disaccharide such as sucrose. In other embodiments, the carbohydrate is a derivative such as inulin fibers.

As used herein, the expression "consists essentially of" indicates that the chewable product can consists of additional (optional) ingredients but that their weight contribution to the final product is less than the combined weight contribution of the ingredients listed above.

The main ingredient in the chewable product is the conditioned complex carbohydrate. As used herein, the "main ingredient" refers to the ingredient having the major percentage in w/w ratio when compared to the other ingredients of the chewable product. In an embodiment, the percentage in w/w ratio of the conditioned complex carbohydrate (with respect to the final chewable product) is at least 5%, 10%, 15%, 20%, 25%, 30%, 35%, 40%, 45%, 50%, 55%, 60%, 65%, 70%, 75% or 80%. In a complementary or alternative embodiment, the percentage in w/w ratio of the conditioned complex carbohydrate (with respect to the final chewable product) is at no more than 5%, 10%, 15%, 20%, 25%, 30%, 35%, 40%, 45%, 50%, 55%, 60%, 65%, 70%, 75% or 80%. In yet another embodiment, the percentage in w/w ratio of the conditioned complex carbohydrate (with respect to the final chewable product) is any range between 5% to 70%.

In an embodiment, the conditioned complex carbohydrate is a conditioned honey. One of the advantages of using a substantially dehydrated honey composition in the manufacture of the chewable product is that it has a pH value which accommodates the formation of the hydrated gel by the gelling agent. As such, it is not necessary, and in some embodiments avoided, that a further acidifying agent be included in the manufacture of the chewable product when a substantially dehydrated honey composition is used as the main ingredient.

As indicated above, in an embodiment, when a liquid complex carbohydrate is used, a further carbohydrate (such as a disaccharide, sucrose for example) is admixed and solubilized prior to its addition to the liquid boiling glucose composition. In such embodiment, the weight ratio of the further carbohydrate when compared to the total weight of the supplemented complex carbohydrate (prior to their addition to the boiling liquid glucose composition) can be between about 20% to 40%. In an embodiment, the weight ratio of the carbohydrate (such as sucrose) when compared to the total weight of the supplemented complex carbohydrate (such as supplemented honey) (prior to their addition to the boiling liquid glucose composition) is at least 20%, 21%, 22%, 23%, 24%, 25%, 26%, 27%, 28%, 29%, 30%, 31%, 32%, 33%, 34%, 35%, 36%, 37%, 38% or 39% and/or no more than 40%, 39%, 38%, 37%, 36%, 35%, 34%, 33%, 32%, 31%, 30%, 29%, 28%, 27%, 26%, 25%, 24%, 23%, 22% or 21%. In still another embodiment, the weight ratio of the further carbohydrate when compared to the total weight of the supplemented complex carbohydrate (prior to their addition to the boiling liquid glucose composition) is any range between about 20% and 40%.

As indicated above, a liquid glucose composition is an ingredient of the chewable product. This liquid glucose composition can be a pure glucose composition, for example, a glucose syrup (42-43 DE for example). In an embodiment, the percentage in w/w ratio of the liquid glucose composition (with respect to the final chewable product) is at least 5%, 10%, 15%, 20%, 25%, 30%, 35%, 40%, 45%, 50%, 55%, 60%, 65% or 70%. In a complementary or alternative embodiment, the percentage in w/w ratio of the liquid glucose composition (with respect to the final chewable product) is at no more than 5%, 10%, 15%, 20%, 25%, 30%, 35%, 40%, 45%, 50%, 55%, 60%, 65% or 70%. In yet another embodiment, the percentage in w/w ratio of the liquid glucose composition (with respect to the final chewable product) is any range between 5% to 70%.

In some embodiments, it is possible to add to the liquid glucose composition another carbohydrate or combinations of carbohydrates to provide a mixture (still in a liquid form). When at least another carbohydrate is added to the liquid glucose composition, as indicated above, the percentage weight ratio between liquid glucose and the additional carbohydrate is at least 50%.

Suitable carbohydrates which can be used in the chewable products generally include monosaccharides, disaccharides and polysaccharides, such as, but not limited to, sucrose (sugar), dextrose, maltose, dextrin, xylose, ribose, glucose, mannose, galactose, fructose (levulose), invert sugar, corn syrups, maltodextrins, fructo-oligo saccharide syrups, partially hydrolyzed starch, corn syrup solids, inulin, inulin fibers and mixtures thereof.

In some embodiments, high-intensity sweeteners also may be included as in the liquid glucose composition. Without being limited to particular sweeteners, representative categories and examples include (a) water-soluble sweetening agents (such as dihydrochalcones, monellin, stevia, steviosides, rebaudioside A, glycyrrhizin, dihydroflavenol, and sugar alcohols, such as sorbitol, mannitol, maltitol, xylitol, erythritol and L-aminodicarboxylic acid aminoalkenoic acid ester amides); (b) water-soluble artificial sweeteners (such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K™), the free acid form of saccharin, and mixtures thereof); (c) dipeptide based sweeteners (such as L-aspartic acid derived sweeteners, such as L-aspartyl-L-phenylalanine methyl ester (Aspartame™), L-alphaaspartyl-N-(2,2,4,4-tetramethyl-3-thietanyl)-D-alaninamide hydrate (Alitame™), N—[N-(3,3-dimethylbutyl)-L-aspartyl]-L-phenylalanine 1-methyl ester (Neotame™), methyl esters of L-aspartyl-L-phenylglycerine and L-aspartyl-L-2,5-dihydrophlenyl-glycine, L-aspartyl-2,5-dihydro-L-phenylalanine; L-aspartyl-L-(1-cysclohexen)-alanine, and mixtures thereof); (d) water-soluble sweeteners derived from naturally occurring water-soluble sweeteners (such as chlorinated derivatives of ordinary sugar (sucrose), e.g., chlorodeoxysugar derivatives, such as derivatives of chlorodeoxysucrose or chlorodeoxygalactosucrose, known, for example, under the product designation of Sucralose; examples of chlorodeoxysucrose and chlorodeoxygalactosucrose derivatives include, but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichloro1',6'-dideoxysucrose; 4-chloro-4-deoxy-alpha-D-galactopyranosyl-1,6-dichloro-1,6-dideoxy-beta-D--fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-ϕructofuranoside, or 4,6,6'-trichloro-4,6,6'-trideoxygalactosucrose, 6,1',6'-trichloro-6,1',6'-trideoxysucrose; 4,6-dichloro-4,6-dideoxy-alpha-D-galacto-pyranosyl-1,6-dichloro-1,6-dideo-xy-beta-D-fructofuranoside, or 4,6,1',6'-tetrachloro4,6,1',6'-tetradeoxygalacto-sucrose; and 4,6,1',6'-tetradeoxy-sucrose, and mixtures thereof), (e) protein based sweeteners (such as thaumatococcus danielli (Thaumatin, I and II) and talin); (f) the sweetener monatin (2-hydroxy-2-(indol-3-ylmethyl)-4-aminoglutaric acid) and its derivatives; and (g) the sweetener Lo han guo (sometimes also referred to as "Lo han kuo" or "Lo han quo") as well as combinations thereof.

In yet another embodiment, when pectin is used as a gelling agent, the liquid glucose composition can also comprise a gel retardant, such as an acidic food-grade salt. In such embodiment, the weight ratio of the acidic food-grade salt to the total liquid glucose composition is between about 0.1% and to about 10%. In an embodiment, the weight ratio of the acidic food-grade salt to the total liquid glucose composition is at least about 0.1%, 0.2%, 0.3%, 0.4%, 0.5%, 0.6%, 0.7%, 0.8%, 0.9%, 1.0%, 2.0%, 3.0%, 4.0%, 5.0%, 6.0%, 7.0%, 8.0% or 9.0% and/or no more than about 10.0%, 9.0%, 8.0%, 7.0%, 6.0%, 5.0%, 4.0%, 3.0%, 2.0%, 1.0%, 0.9%, 0.8%, 0.7%, 0.6%, 0.5%, 0.4%, 0.3% or 0.2%. In still another embodiment, the weight ratio of the acidic food-grade salt to the total liquid glucose composition is any range between about 0.1% and to about 10%.

The gelling agent used in the processes described herein and as such included in the resulting chewable product is at least one of gelatin and/or pectin (including a combination of gelatin and pectin). As used herein, the phrase "gelling agent" refers to a wide ranged family of substances that can thicken and mechanically stabilize (thicken, jellify or solidify) the second mixture. In some embodiments, a gelling agent is partly soluble or partially immiscible in the aqueous solution it is introduced, and therefore transforms it into a colloid mixture (a suspension or emulsion) or colloidal dispersion, as this term is defined herein below, upon applying stress/heat/stirring/sonication, or in some cases allowing ambient temperature to act over a certain time period (e.g., minutes to days). A gelling agent can form a network-like structure, giving the resulting second mixture the consistency of a semi-solid while still being composed substantially of the liquid. In an embodiment, the percentage weight ratio of the gelling agent (with respect to the final chewable product) is at least 1%, 2%, 3%, 4%, 5%, 6%, 7%, 8%, 9% or 10%. In a complementary or alternative embodiment, the percentage weight ratio of the gelling agent (with respect to the final chewable product) is no more than 10%, 9%, 8%, 7%, 6%, 5%, 4%, 3%, 2% or 1%. In yet another embodiment, the percentage weight ratio of the gelling agent (with respect to the final chewable product) is any range between 1% and 10%.

In the present disclosure, pectin can only be combined with gelatin and as such cannot be combined with other gelling agents such as carrageenan. In some embodiment, when the sole gelling agent is pectin, the percentage weight ratio of the gelling agent (with respect to the final chewable product) is at least 1%, 2% or 3% and/or no more than 4%, 3% or 2%. In yet another embodiment, when the sole gelling agent is pectin, the percentage weight ratio of the gelling agent (with respect to the final chewable product) is any range between 1 and 4%. In the embodiment of the process in which pectin is used a gelling agent (either alone or in combination with gelatin), a di-sacharide such as sucrose can be admixed with pectin prior to its addition to the boiling liquid glucose composition. In such embodiment, the weight ratio of pectin with respect to the total weight of the pectin/di-saccharide mixture (prior to their addition to the boiling liquid glucose composition) is between about 10% to 25%. In a further embodiment, the weight ratio of pectin with respect to the total weight of the pectin/di-saccharide mixture (prior to their addition to the boiling liquid glucose composition) is at least 10%, 11%, 12%, 13%, 14%, 15%, 16%, 17%, 18%, 19%, 20%, 21%, 22%, 23% or 24% and/or no more than 25%, 24%, 23%, 22%, 21%, 20%, 19%, 18%, 17%, 16%, 15%, 14%, 13%, 12% or 11%. In still a further embodiment, the weight ratio of pectin with respect to the total weight of the pectin/di-saccharide mixture (prior to their addition to the boiling liquid glucose composition) is any range between 10% and 25%.

In some embodiment, when the sole gelling agent is gelatin, the percentage weight ratio of the gelling agent (with respect to the final chewable product) is at least 5%, 6%, 7%, 8% or 9% and/or no more than 10%, 9%, 8%, 7% or 6%. In yet another embodiment, when the sole gelling agent is gelatin, the percentage weight ratio of the gelling agent (with respect to the final chewable product) is any range between 5 and 10%.

A colloid or colloidal dispersion is a type of homogenous mixture of two separate phases: a dispersed phase and a continuous phase. In a colloid, the dispersed phase is made of droplets that are distributed evenly throughout the continuous phase. Colloidal dispersions, which appear like solutions, are also referred to as colloidal aerosols, colloidal emulsions, colloidal foams, colloidal dispersions, or hydrosols. Hydrocolloid is a common term used in the art to describe a substance that forms a gel with water (e.g., an hydrated gel). An hydrocolloid is a colloid system wherein the colloid particles are dispersed in water or an aqueous solution. A hydrocolloid has colloid particles spread throughout water and depending on the quantity of water available, can take on different states, e.g., gel or sol (liquid). Hydrocolloids can be either irreversible (single-state) or reversible.

The gelling agent included in the chewable composition is safe for human consumption, namely, considered edible and non-deleterious for humans. Common gelling agents include, for example, organic compounds, such as synthetic polymers, polysaccharides, polypeptides and proteins, carbohydrates and dextrins, colloidal and hydrocolloidal dispersants, and minerals. Exemplary edible gelling agents which are suitable for use in the context of the embodiments of the disclosure, include, without limitation, polysaccharides derived from brown algae, such as alginic acid, sodium alginate, potassium alginate, ammonium alginate, calcium alginate, polysaccharide derived from red seaweeds, such as agar and agarose, carrageenan, natural gums from land plants, such as arabinoxylan, cellulose and carboxymethylcellulose, curdlan, gellan gum, guar gum, gum arabic, starch and xanthan gum, and locust bean gum which is a polysaccharides extracted from the carob tree seeds, pectin a polysaccharides extracted from apple or citrus fruits, and proteinous substances, such as gelatin which is produced by partial hydrolysis of animal-derived collagen, and any combinations thereof, and with other synthetic or mineral based substances suitable for use in food products. The preferred gelling agent of the chewable product is gelatin. As shown herein, when gelatin is admixed with the first mixture, it is capable of forming an hydrated gel even in the absence of a second boiling step and, when the main ingredient is a substantially dehydrated honey composition, in the absence of an acidification step.

It is noted herein that each gelling agent has a set of characteristic gelling qualities, such as setting time, setting shrinkage, setting conditions (temperature, ionic strength, ionic type and pH), physico-mechanical properties of the final gel (such as springiness, brittleness and cohesiveness), reversibility of the sol-to-gel transition (such as thermo-reversibility) and other chemical and mechanical properties.

The gelling solution, the first mixture and/or the second mixture can optionally be prepared to include a stabilizer, a flavoring agent and/or an active ingredient.

In some embodiments, the chewable product also comprises one or more stabilizers. The role of the stabilizer is to protect or limit the active ingredient from degradation due to formulation and/or storage. In an embodiment, the percentage weight ratio of the stabilizer (with respect to the final chewable product) is at least 1%, 2%, 3%, 4%, 5%, 6%, 7%, 8%, 9%, 10%, 11%, 12%, 13%, 14% or 15%. In a complementary or alternative embodiment, the percentage weight ratio of the stabilizer (with respect to the final chewable product) is no more than 1%, 2%, 3%, 4%, 5%, 6%, 7%, 8%, 9%, 10%, 11%, 12%, 13%, 14% or 15%. In yet another embodiment, the percentage weight ratio of the stabilizer (with respect to the final chewable product) is any range between 1% and 15%.

One contemplated stabilizer is sugar alcohols or polyols, such as, but not limited to, sorbitol, xylitol, mannitol, galactitol, maltitol, hydrogenated isomaltulose (ISOMALT™), lactitol, erythritol, hydrogenated starch hydrolysates, maltitol, maltitol syrups, glycerol, isomalt, erythritol, xylitol, hydrogenated starch hydrolysates, polyglycitol syrups, polyglycitol powders, lactitol, and combinations thereof. One preferred sugar alcohol is sorbitol. Sorbitol can advantageously be added to the gelling solution after it has been cooled.

Another contemplated stabilizer is polysacchacharides which include, but are not limited to, pectin, bee's wax, carnuba wax and carageenans. Pectin is one of the preferred polysaccharides and can advantageously be included in the gelling solution.

In some embodiments, it may be desirable to include a flavoring agent in the chewable product. In an embodiment, the percentage weight ratio of the flavoring agent (with respect to the final chewable product) is at least 0.1%, 0.2%, 0.3%, 0.4%, 0.5%, 0.6%, 0.7%, 0.8%, 0.9%, 1%, 1.5%, 2%, 2.5%, 3% 3.5% or 4%. In a complementary or alternative embodiment, the percentage weight ratio of the flavoring agent (with respect to the final chewable product) is no more than 0.1%, 0.2%, 0.3%, 0.4%, 0.5%, 0.6%, 0.7%, 0.8%, 0.9%, 1%, 1.5%, 2%, 2.5%, 3% 3.5% or 4%. In yet another embodiment, the percentage weight ratio of the flavoring agent (with respect to the final chewable product) is any range between 0.1% and 4%.

In some embodiments, flavoring agents or flavorants may include those flavors known to the skilled artisan, such as natural and artificial flavors. In some embodiments, the flavoring agent may be employed in either liquid form (e.g., oil-based composition) and/or dried form. These flavorings may be chosen from synthetic flavor oils and flavoring aromatics and/or oils, oleoresins and extracts derived from plants, leaves, flowers, fruits, and so forth, and combinations thereof. Non-limiting representative flavor oils include spearmint oil, cinnamon oil, oil of wintergreen (methyl salicylate), peppermint oil, Japanese mint oil, clove oil, bay oil, anise oil, eucalyptus oil, thyme oil, cedar leaf oil, oil of nutmeg, allspice, oil of sage, mace, oil of bitter almonds, and cassava oil. Also useful flavorings are artificial, natural and synthetic fruit flavors, such as vanilla, and citrus oils including lemon, orange, lime, grapefruit, yazu, sudachi, and fruit essences including apple, pear, peach, grape, blueberry, strawberry, raspberry, cherry, plum, pineapple, apricot, banana, melon, apricot, ume, cherry, raspberry, blackberry, tropical fruit, mango, mangosteen, pomegranate, papaya, and so forth. Other potential flavors whose release profiles may be managed include a milk flavor, a butter flavor, a cheese flavor, a cream flavor, and a yogurt flavor; a vanilla flavor; tea or coffee flavors, such as a green tea flavor, a oolong tea flavor, a tea flavor, a cocoa flavor, a chocolate flavor, and a coffee flavor; mint flavors, such as a peppermint flavor, a spearmint flavor, and a Japanese mint flavor; spicy flavors, such as an asafetida flavor, an ajowan flavor, an anise flavor, an angelica flavor, a fennel flavor, an allspice flavor, a cinnamon flavor, a camomile flavor, a mustard flavor, a cardamom flavor, a caraway flavor, a cumin flavor, a clove flavor, a pepper flavor, a coriander flavor, a sassafras flavor, a savory flavor, a Zanthoxyli Fructus flavor, a perilla flavor, a juniper berry flavor, a ginger flavor, a star anise flavor, a horseradish flavor, a thyme flavor, a tarragon flavor, a dill flavor, a capsicum flavor, a nutmeg flavor, a basil flavor, a marjoram flavor, a rosemary flavor, a bayleaf flavor, and a wasabi (Japanese horseradish) flavor; alcoholic flavors, such as a wine flavor, a whisky flavor, a brandy flavor, a rum flavor, a gin flavor, and a liqueur flavor; floral flavors; and vegetable flavors, such as an onion flavor, a garlic flavor, a cabbage flavor, a carrot flavor, a celery flavor, mushroom flavor, and a tomato flavor. These flavoring agents may be used in liquid or solid form and may be used individually or in admixture. Commonly used flavors include mints, such as peppermint, menthol, spearmint, artificial vanilla, cinnamon derivatives, and various fruit flavors, whether employed individually or in admixture.

In some embodiments, other flavorings including aldehydes and esters, such as cinnamyl acetate, cinnamaldehyde, citral diethylacetal, dihydrocarvyl acetate, eugenyl formate, p-methylamisol, and so forth may be used.

Further examples of aldehyde flavorings include, but are not limited to acetaldehyde (apple), benzaldehyde (cherry, almond), anisic aldehyde (licorice, anise), cinnamic aldehyde (cinnamon), citral, i.e., alpha-citral (lemon, lime), neral, i.e., beta-citral (lemon, lime), decanal (orange, lemon), ethyl vanillin (vanilla, cream), heliotrope, i.e., piperonal (vanilla, cream), vanillin (vanilla, cream), alpha-amyl cinniamaldelhyde (spicy fruity flavors), butyraldehyde (butter, cheese), valeraldehyde (butter, cheese), citronellal (modifies, many types), decanal (citrus fruits), aldehyde C-8 (citrus fruits), aldehyde C-9 (citrus fruits), aldehyde C-12 (citrus fruits), 2-ethyl butyraldehyde (berry fruits), hexenal, i.e., trans-2 (berry fruits), tolyl aldehyde (cherry, almond), veratraldehyde (vanilla), 2,6-dimetyl-5-heptenal, i.e., melonal (melon), 2,6-dimethyloctanal (green fruit), and 2-dodecenal (citrus, mandarin), cherry, grape, blueberry, blackberry, strawberry shortcake, and mixtures thereof.

When the chewable product is used as a delivery system to provide a source of an active ingredient, the chewable product does include such active ingredient. The active ingredient can be added to the first mixture, the second mixture and/or to the gelling solution. In an embodiment, the active ingredient is preferably added in combination with a stabilizer to avoid or limit its degradation (due to formulation or storage).

An active ingredient generally refers to those ingredients that are included in a delivery system and/or for the desired end benefit they provide to the user. In some embodiments, actives may include medicaments, nutrients, nutraceuticals, herbals, nutritional supplements, pharmaceuticals, drugs, and the like and combinations thereof. In an embodiment, the percentage weight ratio of the active ingredient (with respect to the final chewable product) is at least 1%, 2%, 3%, 4%, 5%, 6%, 7%, 8%, 9%, 10%, 15%, 20%, 25%, 30%, 35% or 40%. In a complementary or alternative embodiment, the percentage weight ratio of the active ingredient (with respect to the final chewable product) is no more than 1%, 2%, 3%, 4%, 5%, 6%, 7%, 8%, 9%, 10%, 15%, 20%, 25%, 30%, 35% or 40%. In yet another embodiment, the percentage weight ratio of the active ingredient (with respect to the final chewable product) is any range between 1% and 40%.

The active ingredient can be a functional ingredient, such as, for example, medicaments, nutrients (vitamins and/or minerals), nutraceuticals, such as phytochemicals and the like, breath freshening agents, oral care agents, probiotic materials, prebiotic materials, throat care agents as well as combinations thereof.

Examples of useful drugs include ace-inhibitors, analgesics, antianginal drugs, anti-arrhythmias, anti-asthmatics, anti-cholesterolemics, analgesics, anesthetics, anti-convulsants, anti-depressants, anti-diabetic agents, anti-diarrhea preparations, antidotes, anti-histamines, anti-hypertensive drugs, anti-inflammatory agents, anti-lipid agents, anti-manics, anti-nauseants, anti-stroke agents, anti-thyroid preparations, anti-tumor drugs, anti-viral agents, acne drugs, alkaloids, amino acid preparations, anti-tussives, anti-uricemic drugs, anti-viral drugs, anabolic preparations, systemic and non-systemic anti-infective agents, anti-neoplastics, anti-parkinsonian agents, anti-rheumatic agents, appetite stimulants, biological response modifiers, blood modifiers, bone metabolism regulators, cardiovascular agents, central nervous system stimulates, cholinesterase inhibitors, contraceptives, decongestants, dietary supplements, dopamine receptor agonists, endometriosis management agents, enzymes, erectile dysfunction therapies, fertility agents, gastrointestinal agents, homeopathic remedies, hormones, hypercalcemia and hypocalcemia management agents, immunomodulators, immunosuppressives, migraine preparations, motion sickness treatments, muscle relaxants, obesity management agents, osteoporosis preparations, oxytocics, parasympatholytics, parasympathomimetics, prostaglandins, psychotherapeutic agents, respiratory agents, sedatives, smoking cessation aids, such as bromocryptine or nicotine, sympatholytics, tremor preparations, urinary tract agents, vasodilators, laxatives, antacids, ion exchange resins, anti-pyretics, appetite suppressants, expectorants, anti-anxiety agents, anti-ulcer agents, anti-inflammatory substances, coronary dilators, cerebral dilators, peripheral vasodilators, psycho-tropics, stimulants, anti-hypertensive drugs, vasoconstrictors, migraine treatments, antibiotics, tranquilizers, anti-psychotics, anti-tumor drugs, anti-coagulants, anti-thrombotic drugs, hypnotics, anti-emetics, anti-nauseants, anti-convulsants, neuromuscular drugs, hyper- and hypo-glycemic agents, thyroid and anti-thyroid preparations, diuretics, anti-spasmodics, terine relaxants, anti-obesity drugs, erythropoietic drugs, anti-asthmatics, cough suppressants, mucolytics, DNA and genetic modifying drugs, and combinations thereof. Other drug active ingredients for use in embodiments may include anti-diarriheals, anti-histamines, antitussives, decongestants, vitamins, minerals and breath fresheners. Also contemplated for use herein are anxiolytics; anti-psychotics; non-steroidal anti-inflammatories (NSAID's), anti-histamines; anti-emetics; bronchodilators; anti-depressants; anti-migraines, ACE-inhibitors such; anti-Alzheimer's agents,d CaH-antagonists as well as combinations thereof.

A variety of nutritional supplements may also be used as active ingredients including virtually any vitamin or mineral. For example, vitamin A, vitamin C, vitamin D, vitamin E, vitamin K, vitamin $B_6$, vitamin $B_{12}$, thiamine, riboflavin, folic acid, niacin, pantothenic acid, beta-carotene, sodium, potassium, calcium, magnesium, phosphorus, sulfur, chlorine, iron, copper, iodine, zinc, selenium, manganese, choline, chromium, molybdenum, fluorine, cobalt and combinations thereof may be used.

Various herbals may also be used as active ingredients, such as those with various medicinal or dietary supplement properties. Herbals are generally aromatic plants or plant parts and/or extracts thereof that may be used medicinally or for flavoring. Suitable herbals may be used singly or in various mixtures. Commonly used herbs include Echinacea, Goldenseal, Calendula, Rosemary, Thymne, Kava Kava, Aloe, Blood Root, Grapefruit Seed Extract, Black Cohlosh, Ginseng, Guarana, Cranberry, Gingko Biloba, St. John's Wort, Evening Primrose Oil, Yohimbe Bark, Green Tea, Ma Huang, Maca, Bilberry, Lutein, and combinations thereof.

Micronutrients (also considered as active ingredients) may include materials that have an impact on the nutritional well-being of an organism even though the quantity required by the organism to have the desired effect is small relative to macronutrients, such as protein, carbohydrate, and fat. Micronutrients may include, but are not limited to, vitamins, minerals, enzymes, phytochemicals, antioxidants, and combinations thereof.

In some embodiments, vitamins may include fat soluble vitamins, such as vitamin A, vitamin D, vitamin E, and vitamin K and combinations thereof. In some embodiments, vitamins may include water soluble vitamins, such as vitamin C (ascorbic acid), the B vitamins (thiamine or $B_1$, riboflavoin or $B_2$, niacin or $B_3$, pyridoxine or $B_6$, folic acid or $B_9$, cyanocobalimin or $B_{12}$, pantothenic acid, biotin), and combinations thereof.

In some embodiments minerals may include, but are not limited to, sodium, magnesium, chromium, iodine, iron, manganese, calcium, copper, fluoride, potassium, phosphorous, molybdenum, selenium, zinc, and combinations thereof.

In some embodiments micronutrients may include, but are not limited to, L-carnitine, choline, coenzyme Q10, alpha-lipoic acid, omega-3-fatty acids, omega-6-fatty acids, pepsin, phytase, trypsin, lipases, proteases, cellulases, and combinations thereof.

Another class of active ingredients are antioxidants. Antioxidants may include materials that scavenge free radicals. In some embodiments, antioxidants may include, but are not limited to, ascorbic acid, citric acid, rosemary oil, vitamin A, vitamin E, vitamin E phosphate, tocopherols, di-alpha-tocopheryl phosphate, tocotrienos, alpha lipoic acid, dihydrolipoic acid, xanthophylls, beta cryptoxanthin, lycopene, lutein, zeaxanthin, astaxanthin, beta-carotene, carotenes, mixed carotenoids, polyphenols, flavonoids, and combinations thereof.

In some embodiments phytochemicals may include, but are not limited to, cartotenoids, chlorophyll, chlorophyllin, fiber, flavanoids, anthocyaninis, cyaniding, delphinidin, malvidin, pelargonidin, peonidin, petunidin, flavanols, catechin, epicatechin, epigallocatechin, epigallocatechingallate (EGCG), theaflavins, thearubigins, proanthocyanins, flavonols, qauercetin, kaempferol, myricetin, isorhamnetin, flavononeshesperetin, naringenin, eriodictyol, tangeretin, flavones, apigenin, luteolin, lignans, phytoestrogens, resveratrol, isoflavones, daidzein, genistein, glycitein, soy isoflavonies, and combinations thereof.

The chewable product can also contain a preservative and/or a coloring agent.

The present invention will be more readily understood by referring to the following examples which are given to illustrate the invention rather than to limit its scope.

Example I

Honey Gummy Having Sorbitol as Stabilizer

Gelatin (30.2 g) was hydrated with hot water (30.0 g at ~70° C.) and then allowed to cool. Once the hydrated gelatin was cooled at room temperature, sorbitol (8.9 g) was added to the solution.

In separate vessels, dried honey (177.3 g having less than 05% moisture) was heated at a temperature which caused its complete liquefaction (96° C.). At the same time, glucose 42DE (76.0 g) was heated at a temperature of 115° C.

The liquefied honey was added to the heated glucose and the resulting mixture was mixed until an homogenous mixture was reached. The temperature of the honey-glucose mixture was kept at 115° C.

The gelatin solution was added to the honey-glucose mixture (still at 115° C.). The resulting mixture was mixed slowly until the gelatin solution was completely dissolved.

A vacuum of 28 inHg was applied to the gelatin-honey-glucose mixture to lower the moisture of the product eliminate potential air bubbles.

The vacuum was removed and a flavoring (0.6 g) was added. The resulting mixture was mixing slowly to avoid the introduction of air bubbles.

The resulting mixture was poured into molds and allowed to cool to room temperature.

TABLE 1

Ingredient breakdown (in percentages) of the honey gummy of Example I (batch size of 323 g).

| Ingredient | % |
|---|---|
| Dried Honey | 54.9 |
| Glucose (42DE) | 23.5 |
| Gelatin | 9.3 |
| Water | 9.3 |
| Sorbitol | 2.8 |
| Flavoring (oil based) | 0.2 |

Example II

Processes Using Liquid Honey

Gelatin (30.5 g) was hydrated with water (61.7 g). The hydrated gelatin was then mixed, at room temperature, with liquid honey (262.4 g having more than 10% moisture). The resulting mixture was placed in a flask and boiled under vacuum. No gummy products were obtained as the gelatin recrystalized under vacuum and the product was hard not chewable in texture.

Gelatin (30.2 g) was hydrated with water (60.4 g). The liquid honey was brought to a temperature of 250° F. in an open vessel. Once this temperature was reached, it was maintained, the gelatin was added and stirred until homogenously mixed. No gummy products were obtained as the resulting mixture did not form a proper gel (e.g., it was running and not a solid gummy) and the honey was burned.

Gelatin (30.2 g) was hydrated with water (60.4 g). The liquid honey was brought to a temperature of 250° F. in an open vessel. The gelatin was added and stirred until homogenously mixed. The resulting mixture was poured into molds. No gummy products were obtained as the resulting mixture did not form a proper gel (e.g., it was running and not a solid gummy).

Gelatin (30.2 g) was hydrated with water (60.4 g). The liquid honey was brought to a temperature of 250° F. in an open vessel. sorbitol (8.9 g) was added to the hydrated gelatin. The gelatin-sorbitol mixture was added to the honey and stirred until homogenously mixed. The resulting mixture was poured into molds. No gummy products were obtained as the resulting mixture did not form a proper gel (e.g., it was running and not a solid gummy) and the honey was burned.

Example III

Process Using a Combination of Liquid Honey and Glucose

In this example, in an attempt to prevent the burning of the honey, the formulation was changed to include glucose as a partial replacement for the honey. More specifically, gelatin was hydrated and supplemented with sorbitol. Glucose and honey combined and boiled. The gelatin solution was admixed with the glucose-honey solution. The resulting mixture was poured into molds. The results of these processes are presented in Table 2.

TABLE 2

Characteristics of final products obtained by the processes described in Example III using different ratios between glucose and honey. The percentages of glucose and honey are based on the full weight of the final product (e.g., a single gummy).

| % Glucose | % Honey | Characteristics |
|---|---|---|
| 0 | 75 | Honey has slightly burnt flavour characteristics. |
| 5 | 70 | Chewable product was obtained |
| 15 | 60 | Chewable product was obtained |
| 30 | 40 | Chewable product was obtained |
| 45 | 25 | Chewable product was obtained |
| 70 | 5 | Chewable product was obtained |
| 75 | 0 | This product gels but gets too hard/not easily chewed |

Example IV

Processes Using a Combination of Dehydrated Honey, Glucose and Gelatin

Table 3 below provides the components of Parts 1 and 2 of the processed described in this example.

Process A.

Part 2 is prepared by adding water (~155-160° F.) to gelatin crystals. This was then set aside to cool. Once the mixture is cooled and the gelatin hydrated, it can be broken up into smaller pieces before added to Part 1 to ensure homogeneous end product. Part 1 was heated to a temp of 250° F., once significant amount of thickening has occurred it is removed from the heat and Part 2 is added and stirred until homogeneous product is achieved. The mixture is then poured into molds. This product set, however there is excessive water which causes the product to be unstable. Also there are burnt particles throughout from the honey and the flavor is burnt/caramelized.

Process B.

Part 2 is prepared by adding water (~155-160° F.) to gelatin crystals. This was then set aside to cool. Once the mixture is cooled and the gelatin hydrated, it can be broken up into smaller pieces before added to Part 1 to ensure homogeneous end product). Part 1 was heated to a temperature of 250° F. and to stirred continuously and not allow the mixture to go over 250° F. Once significant amount of thickening has occurred it is removed from the heat and Part 2 is added and stirred until homogeneous product is achieved. The mixture is then poured into molds. This product set, and there was less excessive water but still an unstable product. Also despite extra care taken there are burnt particles in the end product and a distinct burnt/caramelized taste.

Process C.

Part 2 is prepared by adding water (~155-160° F.) to gelatin crystals. This was then set aside to cool. Once the mixture is cooled and the gelatin hydrated, it can be broken up into smaller pieces before added to Part 1 to ensure homogeneous end product. Part 1 was heated to a temp of 250° F. keeping and stirred continuously and not allow the mixture to go over 250° F. Once significant amount of thickening has occurred it is removed from the heat and Part 2 is added and stirred until homogeneous product is achieved. The mixture is then poured into molds. No visible excess of "liquid" on the tops and edges of the final product. However, the product still has burnt/caramelized flavor. There are fewer burnt particles.

Process D.

Part 2 is prepared by adding water (~155-160° F.) to gelatin crystals. This was then set aside to cool. Once the mixture is cooled and the gelatin hydrated, it can be broken up into smaller pieces before added to Part 1 (to ensure homogeneous end product). Part 1 was heated to a temperature of 250° F. keeping and stirred continuously and not allow the mixture to go over 250° F. Once significant amount of thickening has occurred it is removed from the heat and Part 2 is added and stirred until homogeneous product is achieved. The mixture is then poured into molds. Much more stable final product was obtained (e.g., no visible water). However, there is still a slightly burnt/caramelized taste. No visible burnt particles.

Process E.

Part 2 is prepared by adding water (~155-160° F.) to gelatin crystals. This was then set aside to cool. Once the mixture is cooled and the gelatin hydrated, it can be broken up into smaller pieces before added to Part 1 to ensure homogeneous end product. Part 1 was heated to a temperature of 205° F. Once this temperature is reached, it is removed from heat and Part 2 is added and stirred until homogeneous product is achieved. The mixture is then poured into molds. The end product gelled and has good flavor (no burnt flavor nor burnt particles).

Process F.

Part 2 is prepared by adding water (~155-160° F.) to gelatin crystals. This was then set aside to cool. Once the mixture is cooled and the gelatin hydrated, it can be broken up into smaller pieces before added to Part 1 to ensure homogeneous end product. Part 1 was heated to a temp of 250° F., once temperature is reached it is removed from heat and Part 2 is added and stirred until homogeneous product is achieved. The mixture is then poured into molds. The end product gelled and has good flavor. No burnt/caramelized characteristics.

TABLE 3

Characteristics of final products obtained by the processes described in Example III using different ratios between glucose and honey. The percentages of glucose and honey are based on the full weight of the final product (e.g., a single gummy).

| Process | Part 1 (% w/w) | Part 2 (% w/w) | Characteristics |
|---|---|---|---|
| A | Liquid Honey (85) | Gelatin (5) Water (10) | Unstable product Burnt particles Burnt flavor |
| B | Liquid Honey (85) | Gelatin (5) Water (10) | Unstable product Burnt particles Burnt flavor |
| C | Liquid Honey (82) | Gelatin (6) Water (12) | Burnt particles Burnt flavor |
| D | Dehydrated Honey (85) | Gelatin (5) Water (10) | Stable product Slight burnt flavor |
| E | Dehydrated Honey (85) | Gelatin (5) Water (10) | Stable product Characteristic honey flavor |
| F | Dehydrated Honey (75) Glucose DE 42 (10) | Gelatin (5) Water (10) | Stable product Characteristic honey flavor |

Example V

Processes Using Honey, Glucose, Sucrose and Pectin

In this example, a batch of 600 g of chewable product was made.

Part 1 components (sucrose (30 g) and pectin (7.5 g)) are weighed and mixed homogeneously. Part 2 components (honey (168.8 g having more than 10% moisture) and sucrose (97.9 g)) are heated to 70 to 85° C. and stirred to allow sucrose to fully dissolve. Part 3 components (water (140.6 g), glucose (140.6 g) and sodium citrate (10.1 g)) are brought to a light boil at approximately 100 to 105° C. and Part 1 components are added. The resulting mixture is stirred constantly bring to a full boil at approximately 110 to 120° C.

Part 2 and 3 components are brought to the same temperature (approximately 110 to 120° C.) and combined to achieve a homogeneous mixture. Heat is removed and Part 4 components (citric acid (50% solution, 10.1 g)) are added along with color and flavor if desired.

Prior to deposited into molds, the combined mixture should be held above 70° C. to avoid pregelling. The resulting mixture can now be deposited into molds. Once cooled they are removed from molds and allowed to "cure/stiffen" to desired texture. If desired, finishers can be added to the product to provide a coat.

Example VI

Processes Using Honey, Glucose, Sucrose, Pectin and Gelatin

Part 4 ingredients (gelatin (36 g) and water (54 g)) are mixed and brought to a temperature of about 60 to 70° C. In this example, it took about an hour for the gelatin to completely dissolve (e.g., for the mixture to turn from opaque to transparent). Part 1 ingredients (sucrose (16.2 g) and pectin (1.8 g)) are weighed and mixed homogeneously. Part 2 ingredients (honey (177.12 g having more than 10% moisture) and sucrose (65.4 g)) are heated to about 70 to 85° C. and stirred to allow sucrose to fully dissolve. Part 3 ingredients (water (137.8 g), glucose (98.4 g), sodium citrate (33% solution, 0.7 g)) are brought to a light boil at approximately 100 to 105° C. and part 1 ingredients are added. The resulting mixture is stirred constantly and brought to a full boil at approximately 110 to 120° C.

Part 2 and 3 ingredients are brought to the same temperature (110-120° C.) and combined to achieve a homogeneous mixture. Heat is removed when the mixture reaches a temperature ~100° C. Part 4 ingredients are added and mixed until homogenous. Part 5 ingredient (citric acid solution (50% solution, 12.3 g) can be added along with color and flavor if desired. The resulting mixture should be held above 75° C. to avoid the formation of a gel. The mixture can now be deposited into molds. Once cooled, the resulting chewable products are removed from molds and allowed to "cure/stiffen" to desired texture. If desired, finishers can be added to the product to provide a coat.

While the invention has been described in connection with specific embodiments thereof, it will be understood that the scope of the claims should not be limited by the preferred embodiments set forth in the examples, but should be given the broadest interpretation consistent with the description as a whole.

What is claimed is:

1. A process for making a chewable gel product, said process comprising:
   a) providing a heated and liquefied supplemented complex carbohydrate composition, comprising:
      i) forming the supplemented complex carbohydrate composition comprising honey with sucrose;

ii) heating the supplemented complex carbohydrate composition at a temperature of 70 to 85° C. to obtain the heated and liquefied supplemented complex carbohydrate composition;
b) heating a liquid glucose composition to a temperature between 105° C. and 122° C.;
c) combining the heated liquid glucose composition with the heated and liquefied supplemented complex carbohydrate composition to obtain a first mixture;
d) adding at least one gelling agent to the first mixture to obtain a second mixture, wherein the at least one gelling agent comprises pectin, gelatin, or a mixture of pectin and gelatin; and
e) cooling the second mixture to ambient temperature to obtain the chewable gel product;
wherein during or after step c), the first mixture and the second mixture are not boiled to a temperature of more than 122° C.;
wherein the chewable gel product comprises:
no burnt particles;
from 5 to 70 wt. % honey based on the total weight of the chewable gel product;
from 5 to 70 wt. % of the liquid glucose composition based on the total weight of the chewable gel product; and
optionally 1 to 15 wt % of sorbitol based on the total weight of the chewable gel product.

2. The process of claim 1, wherein the at least one gelling agent comprises pectin.

3. The process of claim 2, further comprising, prior to step c), admixing the liquid glucose composition with a gel retardant.

4. The process of claim 2, further comprising, prior to step d), admixing pectin with a second carbohydrate.

5. The process of claim 4, wherein the second carbohydrate is a di-saccharide.

6. The process of claim 5, wherein the di-saccharide is sucrose.

7. The process of claim 2, wherein the at least one gelling agent comprises pectin and gelatin.

8. The process of claim 7, wherein the gelatin of the at least one gelling agent to be added to the first mixture is non-hydrated gelatin.

9. The process of claim 1, wherein the at least one gelling agent comprises gelatin and the chewable product does not comprise pectin.

10. The process of claim 9, wherein the at least one gelling agent is gelatin in a hydrated form.

11. The process of claim 10, further comprising a step of obtaining the gelatin in the hydrated form, the obtaining the gelatin in the hydrated form step comprising combining an aqueous solution and gelatin in a non-hydrated form so as to obtain a gelling mixture and heating the gelling mixture to obtain the gelatin in the hydrated form.

12. The process of claim 11, wherein the gelling mixture is heated to a temperature of about 50° C. to about 75° C.

13. The process of claim 1, further comprising combining an active ingredient with the first mixture, the second mixture and/or the at least one gelling agent.

14. The process of claim 1, further comprising, prior to step d), applying a vacuum to the second mixture.

15. The process of claim 1, wherein step i) comprises supplementing honey with sorbitol to obtain the supplemented honey composition.

16. The process of claim 1, wherein step i) comprises supplementing honey with sucrose to obtain the supplemented honey composition.

17. The process of claim 1, wherein step e) comprises cooling the second mixture in a mold.

* * * * *